US008301703B2

(12) United States Patent
Boss et al.

(10) Patent No.: US 8,301,703 B2
(45) Date of Patent: Oct. 30, 2012

(54) SYSTEMS AND METHODS FOR ALERTING ADMINISTRATORS ABOUT SUSPECT COMMUNICATIONS

(75) Inventors: Gregory J. Boss, American Fork, UT (US); Christopher J. Dawson, Arlington, VA (US); Barry M. Graham, Silver Spring, MD (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 11/426,966

(22) Filed: Jun. 28, 2006

(65) Prior Publication Data

US 2008/0005312 A1 Jan. 3, 2008

(51) Int. Cl.
G06F 15/16 (2006.01)
G06F 15/173 (2006.01)
(52) U.S. Cl. .................................. 709/206; 709/224
(58) Field of Classification Search .................. 709/206, 709/224
See application file for complete search history.

(56) References Cited

U.S. PATENT DOCUMENTS

| | | | |
|---|---|---|---|
| 6,112,227 A | 8/2000 | Heiner | |
| 6,321,267 B1* | 11/2001 | Donaldson | 709/229 |
| 6,393,465 B2 | 5/2002 | Leeds | |
| 6,965,919 B1* | 11/2005 | Woods et al. | 709/206 |
| 7,149,778 B1* | 12/2006 | Patel et al. | 709/206 |
| 7,249,175 B1* | 7/2007 | Donaldson | 709/225 |
| 7,587,760 B1* | 9/2009 | Day | 726/22 |
| 7,647,376 B1* | 1/2010 | Jagger et al. | 709/206 |
| 8,032,594 B2* | 10/2011 | Helsper et al. | 709/206 |
| 2002/0116641 A1* | 8/2002 | Mastrianni | 713/201 |
| 2003/0172294 A1* | 9/2003 | Judge | 713/200 |
| 2004/0015554 A1* | 1/2004 | Wilson | 709/206 |
| 2005/0055410 A1* | 3/2005 | Landsman et al. | 709/206 |
| 2005/0108337 A1* | 5/2005 | Lorenz | 709/206 |
| 2005/0114453 A1* | 5/2005 | Hardt | 709/206 |
| 2005/0144279 A1* | 6/2005 | Wexelblat | 709/225 |
| 2005/0169274 A1* | 8/2005 | Shuster | 370/392 |
| 2005/0172003 A1* | 8/2005 | Richardson, Jr. | 709/206 |
| 2005/0172213 A1* | 8/2005 | Ralston et al. | 715/500 |
| 2005/0198159 A1* | 9/2005 | Kirsch | 709/206 |
| 2005/0198508 A1* | 9/2005 | Beck | 713/170 |

(Continued)

OTHER PUBLICATIONS

Posey, Brien M. "How to remove your Exchange server from spam blacklists" http://searchexchange.techtarget.com/news/1182942/Part-3-How-to-remove-your-Exchange-server-from-spam-blacklists Apr. 20, 2006, pp. 1-11.*

(Continued)

*Primary Examiner* — Imad Hussain
(74) *Attorney, Agent, or Firm* — Garg Law Firm, PLLC; Rakesh Garg; Mark C. Vallone (57) ABSTRACT

Systems, methods, and computer program products for alerting system administrators and owners about suspect communications, such as communications from open relay, blacklisted, and blocked computers, are disclosed. Embodiments comprise receiving information related to a communication of an electronic document from one computer to another, determining if the sending computer is either blacklisted, and alerting the administrator or owner of the sending computer if it is identified as suspect. In some embodiments, determining if the sending computer is suspect comprises examining blacklisted IP addresses and/or blacklisted domain names. Some embodiments determine the identity of the administrator by examining WHOIS database information. In some embodiments, alerting the administrator or owner comprises sending them an e-mail.

20 Claims, 5 Drawing Sheets

U.S. PATENT DOCUMENTS

| | | | |
|---|---|---|---|
| 2005/0204005 A1* | 9/2005 | Purcell et al. | 709/206 |
| 2005/0216587 A1* | 9/2005 | John | 709/225 |
| 2005/0273855 A1 | 12/2005 | Oberle et al. | |
| 2006/0020672 A1* | 1/2006 | Shannon et al. | 709/206 |
| 2006/0036690 A1 | 2/2006 | O'Neil | |
| 2006/0037070 A1* | 2/2006 | Davis et al. | 726/11 |
| 2006/0092861 A1* | 5/2006 | Corday et al. | 370/256 |
| 2006/0168065 A1* | 7/2006 | Martin | 709/206 |
| 2006/0259551 A1* | 11/2006 | Caldwell, Jr. | 709/204 |
| 2007/0271348 A1* | 11/2007 | Yang | 709/206 |
| 2007/0294281 A1* | 12/2007 | Ward et al. | 707/102 |
| 2009/0144408 A1* | 6/2009 | Wilf et al. | 709/224 |

OTHER PUBLICATIONS

Cornell University. "Open Mail Relays" Jan. 16, 2002, pp. 1-2. http://www.cit.conrell.edu/computer/security/openmail.html.*

Cloudmark, "Messaging Security Solutions, Anti-Spam. Anti-Phishing. Zero-Hour Anti-Virus", Cloudmark—Anti Spam and Spam Blocker Solutions, http://web.archive.org/web/20060615035505/www.cloudmark.com/desktop/ howitworks.

* cited by examiner

SYSTEMS AND METHODS FOR ALERTING ADMINISTRATORS ABOUT SUSPECT COMMUNICATIONS

FIELD

The present invention generally relates to the fields of networked computer systems, communication protocols for computers connected in networks, and transferring documents between computers in networks. More particularly, the present invention relates to systems, methods, and computer program products for alerting computer administrators about problems of computers systems or applications.

BACKGROUND

Ever since the first electronic mail document was transmitted from one computer to another in 1971, people have increasingly adopted electronic mail as a convenient and relatively quick means of communication. Today it is estimated that over 60 billion electronic mail, or e-mail, documents are transmitted between computers around the world each day. Additionally, people today rely on computer networks to transfer other types of files, other than e-mail documents, such as binary encoded executable files.

The computers that transfer e-mail and other electronic documents, networks connecting the computers, and applications used to create, send, and receive the electronic documents have changed dramatically during this period of explosive growth. In 1969, the Internet consisted of just four interconnected host computer systems. Today, the Internet has grown to tens of millions of interconnected computer systems. Early e-mail documents consisted largely of text-only characters entered at so-called dumb terminals that communicated with mainframe computers. Today most e-mails are conveniently created by individuals using personal computers, laptop computers, palm-type computer, personal organizers, and even such devices as cellular telephones. People transfer various types of files using a variety of different communication protocols. While much of the explosive growth in e-mail usage has been positive, with more and more people increasingly using e-mail, some of this growth has been negative. To understand why some of the growth has been negative, one needs to have a fundamental understanding of how computers generally send electronic documents from one computer to the next.

Each computer on the Internet is part of a network. Many individuals connect to networks of local Internet Service Providers (ISPs) using modems in their homes. Businesses generally connect groups of computers together forming Local Area Networks. Internet Service Providers and businesses connect their networks to other networks and communications devices comprising various other larger networks and Internet backbones, which are connected in some fashion. Essentially, the Internet is a collection of interconnected networks. Special computers on the Internet, called routers, receive commands conforming to differing protocols and execute those commands, sending information between other routers and computers running client and server applications. For example, to send an e-mail document a person may create a message using a computer program, called an e-mail client, and send it to an e-mail recipient by sending the e-mail to a computer on the Internet running an e-mail server application. Based on the address information contained in or attached to the e-mail, the server will work with other server applications and usually transfer the e-mail document to a computer which temporarily stores the document until it is retrieved by the recipient using another e-mail client application.

One powerful feature of e-mail clients is that they have the ability to send e-mail documents to more than one user. For example, the person in the example above could create a single message but send it to fifty friends. While this feature may be convenient for most individuals, it has been the subject of abuse by certain individuals and companies. For example, an unscrupulous person may want to sell a certain product to as many people that he or she can contact. This person may describe the item in an e-mail and send copies of the e-mail to hundreds and thousands of e-mail recipients. Such unsolicited mail, often referred to as spam, cost businesses in the United States alone more than $10 billion dollars and accounted for almost half of all U.S. internet e-mail traffic in 2003. Additionally, handling these electronic documents increases network communication loads, consumes server storage space, and costs individuals time in having to read and delete them. Today, most of this spam is undesirable and most ISPs work hard to combat it from clogging their systems.

A method that ISPs and other network and system administrators have adopted to combat spam is called blacklisting. Described in its most simple form, various ISPs and organizations maintain databases of computer systems, or servers, that are suspected or known to be sources of active spam generation. For instance, when a spammer generates spam e-mail and sends it to e-mail recipients, the ISPs, organizations, and special detection routines running on e-mail servers, detect such usage, flag the server or computer source of the e-mail, and add it to blacklist, block, or suspect databases. In subsequent transfers of e-mail, servers are programmed to detect where e-mails originate and reject them if they originate from or pass through a server or computer listed in one of the databases.

While the practice of blacklisting has helped reduce spam, it has unfortunate consequences. A major problem caused by blacklisting is the blocking of legitimate e-mail. For example, an e-mail server may be owned by an ISP and used to send e-mail for hundreds of subscribers of the ISP. A spammer may exploit some security flaw in the server, gain control of it, and use it to send out thousands of spam e-mail documents. Consequently, such usage may get flagged and cause the server to be added to one or more of the blacklist databases. Once blacklisted, e-mail servers on the Internet start rejecting even legitimate e-mail documents sent from the blacklisted servers. When servers reject e-mail from a blacklisted server, they will often send a response message to the sender of the e-mail, saying that the e-mail has been rejected. However, the sender is most often just a simple ISP subscriber, incapable or ill-equipped to resolve the problem. The subscriber usually does not know who to contact or how to remedy the problem. Additionally, the sender may not even realize the e-mail was rejected and be expecting a reply, leading to frustration, disappointment, and maybe friction between the sender and the intended recipient. Ultimately, an administrator of the ISP must usually remedy the problem of the server and remedy the blacklisting status of the server, not the subscriber.

There are currently only a few ways an e-mail sender may remedy the situation. The sender may send the e-mail again using a different server. The sender may contact the ISP of the server and ask them to fix the problem causing the server to be blacklisted. The sender may send the message using another ISP having a different server. The sender may use a different e-mail address for the recipient, if they have one, causing the e-mail to be delivered using a different server which may not use blacklisting or have the blacklisted server in its database. The sender may even resort to calling the recipient by phone to convey the message.

Given the current art, therefore, alternative methods, systems, and computer program products are needed to alert ISP providers and system administrators about computer systems, servers, and other applications that are suspect. Such alternative methods, systems, and programs may help restore the computer systems back to normal operation much sooner, may reduce the quantity of rejected e-mail that is legitimate, and may eliminate involving individuals incapable of resolving the problems.

SUMMARY

The problems identified above are in large part addressed by systems, methods, and computer program products for alerting system administrators about the suspect status of computer systems or applications. For example, some computers may be flagged as suspect due to operating as an open relay, being block, or being blacklisted. One embodiment comprises a method of alerting an administrator of a computer system about the computer being suspect. The method generally involves receiving information related to an electronic document transmitted from the computer to another computer, determining the computer is suspect, and transmitting a message based upon identified contact information. One embodiment of the method includes comparing network address information of the computer with one or more network addresses in a blacklist database. Other variations include identifying contact information by examining one or more entries in a WHOIS database. Another variation of the method generally includes notifying a user who initiated the transmission of the electronic document that the document was not delivered to one or more of the intended recipients. One method embodiment comprises automatically addressing a problem that causes the computer to be suspect.

A further embodiment comprises a system for alerting an administrator of a suspect computer. The system generally comprises a document reception module to receive information associated with the electronic document, a suspect determination module, a contact determination module, and a notification module. Variations of the system include a document rejection module to prevent delivery of the electronic document and an override module to override the document rejection module. One embodiment of the system is implemented as an SMTP server.

A further embodiment comprises a computer program product comprising a computer usable program for alerting an administrator about the suspect status of a document sending computer. When the computer program is executed, the program generally causes a computer to receive information of an electronic document, determine the sending computer is suspect, and transmit a message to alert the administrator of the sending computer about the sending computer being suspect.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the present invention relates to systems, methods, and computer program products for alerting system administrators about problems of computer systems or applications. Embodiments comprise receiving information related to a communication of an electronic document from one computer system to another, determining if the sending computer is suspect, and attempting to alert the administrator or owner of the sending computer if it is identified as suspect. In some embodiments, determining if the sending computer is suspect comprises examining blacklisted IP addresses and/or blacklisted domain names. Some embodiments determine the identity of the administrator by examining WHOIS database information. In some embodiments, alerting the administrator or owner comprises sending them an e-mail.

While many portions of the following detailed discussion describe "blacklisted" computers and other portions of the discussion describe "suspect" computers, one should note that such terms may often be substituted to describe distinct alternative embodiments. For example, a computer identified as suspect may mean the computer has been blacklisted due to having sent a large quantity of SPAM e-mail. Alternatively, the suspect status may indicate that the computer has another problem, such as being identified as an open relay, in which case another computer receiving an electronic document from the suspect computer may respond differently to the electronic document transmission, such as rejecting or delivering the electronic document.

Additionally, while other portions of the following detailed discussion describe actions occurring on a single or relatively few computers, a person of ordinary skill in the art will appreciate that different combinations of single and multiple computers may work independently and in conjunction to accomplish the described tasks. For example, some embodiments describe sending or receiving electronic documents by single computer systems. Other embodiments may accomplish the same tasks using multiple computers instead of just one. Similarly, while some tasks are described as being completed by multiple computer systems, the tasks may be completed by single computer systems.

Even further, some portions of the detailed discussion describe computer systems while other portions describe applications. In many instances the terms are interchangeable and still describe complimentary embodiments of the invention. For example, some discussions describe blacklisting a server application while other discussions describe blacklisting a computer system. A computer system described as being blacklisted may generally be interpreted to refer to one or more applications of the computer being blacklisted. One should understand that a computer system described as being blacklisted may have other applications and/or hardware parts operating which are not blacklisted.

Similarly, many of the discussions use the terms "server" and "client". Generally, the term "server" may refer to a computer or device on a network that manages network resources. For example, a file server may comprise a computer and storage device dedicated to storing files. A user on a network connected to the file server may use the file server store and retrieve files on the server. Similarly, a database server may comprise a computer system that processes database queries. In different embodiments, servers may be dedicated, meaning that they perform no other tasks besides their designated server tasks. In other embodiments, however, a single computer may execute several programs at once. A server in this case may refer to the program that is managing resources rather than the entire computer. Clients may generally be thought of as computer applications running on computer systems that access the services provided by server applications and dedicated server computers. Many of the discussions refer to clients, client applications, servers, server applications, and computer system. In many instances, these terms are interchangeable. Accordingly, one should not conclude that a discussion that uses only "client" or "server" terms, as opposed to using "computer" or "computer systems" terms, is meant to limit the discussion to one term or the other. One of ordinary skill in the art will recognize that such variations may be substituted for the described methods and systems, and employed in accordance with similar constraints, to perform substantially equivalent functions.

Figure 1:
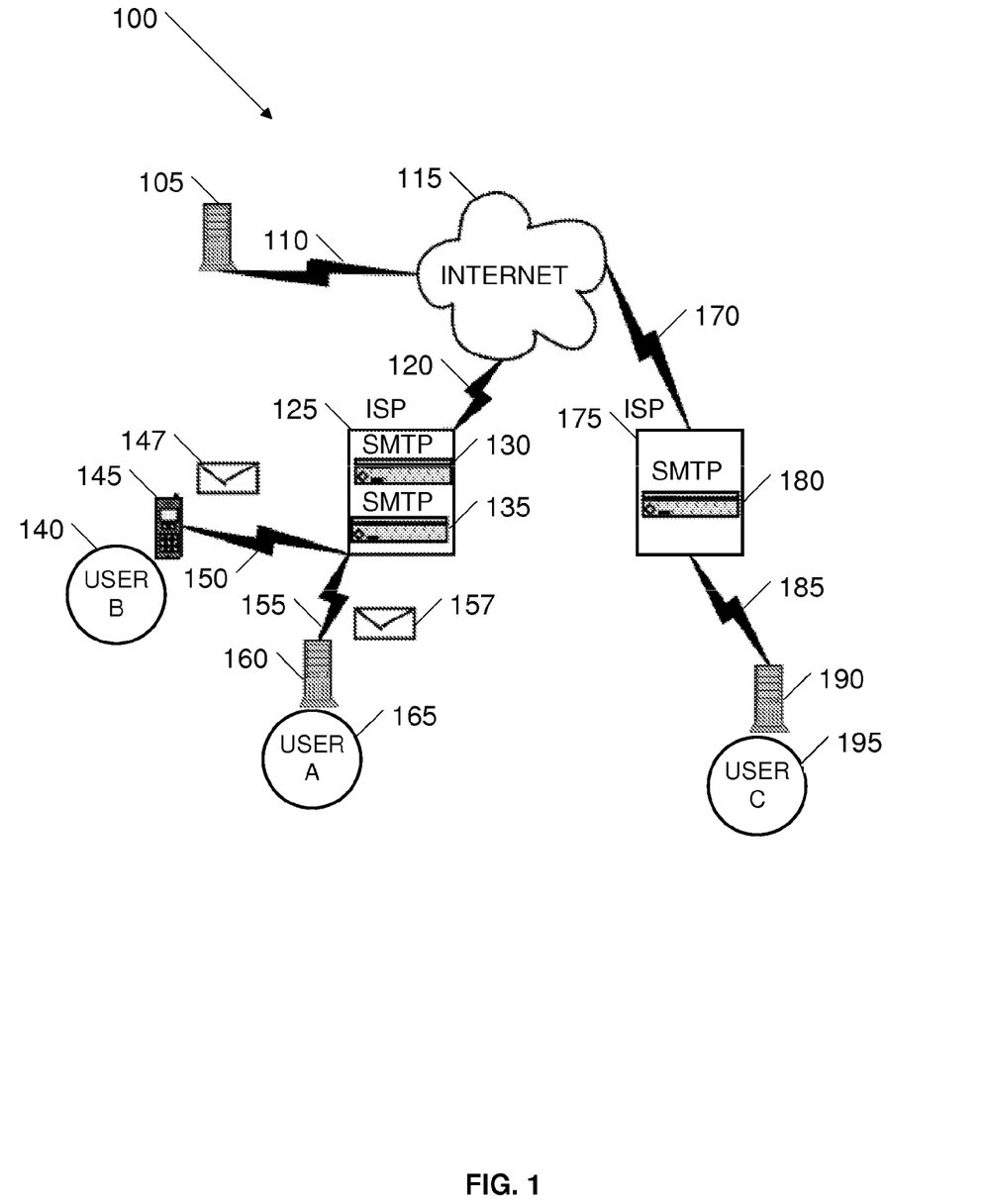
FIG. 1 depicts a network of computer systems connected to an Internet, wherein one of the computer systems may be suspect.

Turning to the drawings, FIG. 1 illustrates how a server may alert an ISP about a suspect status of a Simple Mail Transfer Protocol (SMTP) server. FIG. 1 shows a network of computer systems 100 connected to an Internet 115. An Internet Service Provider (ISP) 125 may provide Internet connectivity and Internet services to a number of customers, such as user 140 and user 165. Users 140 and 165 may use ISP 125 to connect to the Internet 115 to send and receive e-mail and other documents as well as use the Internet 115 to read web logs, read news articles, and make merchandise purchases.

For the sake of discussion, suppose user 165 wants to send some digital family pictures and an e-mail message to his friend, user 195. User 165 may run an e-mail application on a personal computer 160 to create the message and attach the pictures, resulting in e-mail document 157. The personal computer 160 may be connected to ISP 125 by way of a communication link 155. Communication link 155 may comprise a cable or Digital Subscriber Line (DSL) modem, network cables, routers, switches, and other network hardware to facilitate communication between the personal computer 160 and networking systems of ISP 125.

While connected to the networking systems of ISP 125, user 165 may send e-mail document 157 to ISP 125 over communication link 155. ISP 125 may have a first Simple Mail Transfer Protocol (SMTP) server 130 and a second SMTP server 135 which it uses to send subscriber e-mail over the Internet 115. In delivering the e-mail document, SMTP server 135 may perform a series of preliminary steps. For example, SMTP server 135 may receive the name of the recipient and the name of the sender, receive any subject line, and receive e-mail document 157 comprising the body of the message and the attached pictures. SMTP server 135 may format the names of the sender and recipient and append them to the bottom or end of e-mail document 157. SMTP server 135 may also incorporate other types of information into e-mail document 157, such as the subject line and the time and date that SMTP server 135 received e-mail document 157.

To deliver the e-mail message, SMTP server 135 may then separate the address of the recipient into two parts: the name of the recipient and the domain name. For example, the e-mail address for user 195 may be "userC@isp175.com". SMTP server 135 may separate the e-mail name of the recipient, "userC", from the domain name, "isp175.com". SMTP server 135 may then use communication link 120 to communicate with one or more Domain Name Servers (DNS) on the Internet to obtain the Internet Protocol (IP) address of "isp175.com", which may correspond to SMTP server 180 for ISP 175.

Upon obtaining the IP address for SMTP server 180, SMTP server 135 may then communicate with SMTP server 180 via communication link 120, the Internet 115, and communication link 170. SMTP server 135 may send the recipient and sender names, the subject line, the message, and the encoded picture information of e-mail document 157. Upon receipt, SMTP server 180 may incorporate other types of information into e-mail document 157, such as the time and date that SMTP server 180 received e-mail document 157 and the domain name and IP address for SMTP server 135. SMTP server 180 may be configured to temporarily ignore, or bypass, any blacklist server routines. Assuming SMTP server 180 is configured to temporarily ignore or bypass any server blacklist verification routines, it may then transfer or send e-mail document 157, as modified, to another server program of ISP 175 for storage until user 195 retrieves it. For example, SMTP server 180 may then transfer e-mail document 157 to a Post Office Protocol (POP) server or an Internet Mail Access Protocol (IMAP) server. User 195 may then use an e-mail client program on personal computer 190, establish a communication link 185 with ISP 175, and retrieve a copy of e-mail document 157.

In an alternative scenario, SMTP server 180 may have one or more server problem identification routines enabled. If such routines are enabled, SMTP server 180 may handle e-mail document 157 differently based upon a suspect status of SMTP server 135. As noted above, upon receiving e-mail document 157 from SMTP server 135, SMTP 180 may make note of the domain name and IP address for SMTP server 135. Again, one should note that for this example SMTP 135 is the server from which e-mail document 157 originated. SMTP server 180 may compare the domain name and IP address of SMTP server 135 with entries in a database containing the domain names and IP addresses of suspect SMTP servers, such as those that have been blacklisted or blocked. For example, the database may contain information related to SMTP servers that have been positively identified as sources of spam e-mail. Alternatively, the database may contain information related to SMTP servers that have been noted as open relays.

If SMTP server 180 determines that SMTP server 135 is listed in the suspect database, SMTP server 180 may either delete e-mail document 157 or temporarily store a copy of it. SMTP server 180 may acknowledge to SMTP server135 that SMTP server 180 has successfully received e-mail document 157, but that e-mail document 157 is being rejected. Upon receiving this rejection error, SMTP server 135 may temporarily store e-mail document 157 in an e-mail message queue, in hopes of delivering the message later.

SMTP server 180 may then send an informational report via e-mail back to user 165. The informational report may inform user 165 that SMTP server 180 rejected e-mail document 157 due to SMTP server 135 being identified as suspect. The report may also inform user 165 that user 195 did not receive a copy of e-mail document 157, send a copy back to user 165, and describe actions that user 165 may take to deliver e-mail document 157 to user 195. For example, SMTP 180 may tell user 165 to use a different sending SMTP server, use a different ISP, or use a different e-mail address for user 195.

SMTP server 180 may then determine an identity of an administrator for SMTP server 135. In this example, ISP 125 administrates SMTP server 135. To determine that ISP 125 is the administrator for SMTP server 135, SMTP server 180 may consult a WHOIS database server 105 connected to the Internet 115 via communication link 110. SMTP server 180 may send the IP address for SMTP server 135 to WHOIS database server 105 and request the identity and contact information for the administrator on record for SMTP server 135. WHOIS database server 105 may respond to this request by sending the name, address, telephone numbers, and e-mail addresses of ISP 125 back to SMTP server 180. For example, WHOIS database server 105 may return the "RTech" e-mail address as "rtech@isp125.com" and the "OrgTech" e-mail address as "orgtech@isp.com".

Using the e-mail addresses obtained from WHOIS database server 105, SMTP server 180 may then send an e-mail to an administrator for ISP 125. In the e-mail, SMTP server 180 may inform the administrator of the suspect status of SMTP server 135, the reason it is suspect, and that e-mail document 157 was denied delivery due to the suspect status. After sending the e-mail to the administrator to alert ISP 125 to the suspect status, SMTP server 180 may also send a separate e-mail to user 165 providing details about what actions were taken to alert ISP 125 about the problem.

After being informed of the suspect status of SMTP server 135, the administrator for ISP 125 may then take whatever remedial actions are necessary to remove the suspect status of SMTP server 135. For example, if SMTP server 135 was blacklisted due to operating as an open relay, the administrator may correct this problem. Additionally, the administrator of ISP 125 may then send an e-mail to ISP 175, or the administrator of SMTP server 180, saying that the problem has been resolved and that SMTP server 135 should no longer be listed or identified as suspect.

In an alternative embodiment, in addition to sending the e-mail to the administrator for ISP 125, SMTP server 180 may also send a notification to SMTP server 135 that it has been listed as suspect. Depending on the nature of the problem, SMTP server 135 may automate the process of either fixing or addressing the problem and transmit a message back to SMTP server 135 to indicate the problem has been fixed or addressed. Additionally, SMTP server 135 may send a request for a release of the suspect status to the administrator of WHOIS database server 105. Similar to automating the repair, the WHOIS database server 105 may automatically verify that the problem has been fixed and remove SMTP server 135 from the suspect database list. In an even further embodiment, SMTP server 135 may attempt to resend e-mail document 157 after SMTP server 135 fixed or addressed the problem.

Upon receiving the request from the administrator of ISP 125 to remove the blacklisted status of SMTP server 135, the administrator for ISP 175 may verify that the problems have been rectified and remove SMTP server 135 from the database containing the domain names and IP addresses of blacklisted SMTP servers. Alternatively, if ISP 175 does not maintain the database blacklisting SMTP server 135, the administrator may temporarily override the suspect status of SMTP server 135 and deliver any e-mail documents received from SMTP server 135. For example, the administrator of ISP 175 may program SMTP server 180 to receive and deliver messages from SMTP server 135 for a period of one week, even though SMTP server 135 may be identified as suspect. Responding in this manner may allow SMTP server 135 to deliver e-mail documents to users of ISP 175 by way of SMTP server 180 while the administrator of ISP 125 works with the owner or administrator of the suspect database to remove SMTP server 135 from it.

After removing the suspect status for SMTP server 135 from its suspect server database, or temporarily overriding the suspect status for entries in another database, the administrator of ISP 175 may notify the administrator of ISP 125 whereupon the ISP 125 administrator may have SMTP 135 resend e-mail document 157 to user 195. Additionally, upon receiving e-mail document 157 and delivering it to user 195, SMTP server 180 may send a status update to user 165 saying that e-mail document 157 has been successfully delivered to user 195.

One should note that the network of computer systems 100 in FIG. 1 only illustrates a simple network and one example of how an SMTP server may alert an ISP about a suspect SMTP server. Other network arrangements, involving different numbers of personal computers, SMTP servers, Internet Service Providers, suspect databases, suspect database servers, and WHOIS database servers. For example, in alternative embodiments, ISP 175 may have multiple numbers of SMTP servers, such as two, five, or ten SMTP servers, and so on. Each of the receiving SMTP servers may individually receive e-mail documents, check the suspect status for the originating servers, perform WHOIS queries for blacklisted SMTP servers, and alert the administrators and/or owners of the blacklisted servers.

In other alternative embodiments, the SMTP servers receiving the e-mail documents from identified suspect SMTP servers may respond in different ways. For example, in some embodiments SMTP server 180 may alert the administrator of ISP 125 to the identified suspect status of SMTP 135 but not tell user 165 that e-mail document 157 was not successfully delivered to user 195. Alternatively, SMTP server 180 may tell user 165 that e-mail document 157 was not successfully delivered but not give any reason for why the delivery failed.

Additionally, in other alternative embodiments, SMTP server 180 may receive e-mail document 157, deliver it to user 190, but still alert ISP 125 as to the suspect status of SMTP server 135. SMTP server 180 may, however, start counting the number of e-mail documents received from SMTP server 135. If the number of e-mails received from SMTP server 135 passes a threshold number, say ten for example, while STMP server 135 remains identified as suspect SMTP server 180 may then start rejecting e-mails and alerting the senders of the failed deliveries. In even further embodiments, SMTP server 180 may deliver a certain number of e-mail documents from blacklisted SMTP server 135 before alerting its administrator.

While the foregoing discussion demonstrated that an SMTP server may reject an e-mail document that a personal computer transmitted and alert an associated system administrator, some embodiments may reject other types of documents transmitted from other devices. For example, FIG. 1 shows user 140 having a portable computing device 145. In some embodiments, portable computing device 145 may comprise a cellular telephone capable of sending and receiving e-mail documents or text messages. In other embodiments, portable computing device 145 may comprise a wi-fi capable personal organizer having an ability to send and receive electronic documents and messages. Like user 165, user 140 may also receive Internet service from ISP 125. User 140 may connect to the Internet 115 using portable computing device 145 over communication link 150.

Communication link 150 may be a wireless communication session created at a wi-fi hot spot or with a wireless access point created by a router in the home of user 140. User 140 may create an electronic message 147, log in to ISP 125, and connect to the Internet 115 by establishing an Internet session over communication link 150. Once connected to the Internet 115, user 140 may attempt to send electronic message 147 to user 195 by way of SMTP server 135. Similar to the handling of e-mail document 157, SMTP server 180 may receive electronic message 147 from SMTP server 135 and determine whether SMTP server 135 is blacklisted. If SMTP server 135 is blacklisted, SMTP server 180 may go through the process of determining the identity of the administrator for SMTP server 135 and notifying the administrator of the blacklisted status.

In handling electronic message 147, SMTP server 180 may dispose of it in one of several ways. SMTP server 180 may reject it, temporarily save it without delivering it, or even deliver it to user 195. For example, from information contained in electronic message 147, SMTP server 180 may determine that electronic message 147 is a different type of document. In other words, electronic message 147 may be of a character or type which has a low risk of being spam e-mail. Accordingly, SMTP server 180 may permit electronic message 147 to be delivered to user 195.

Worth pointing out is the potential for an SMTP server to respond to different computer systems in a domain differently. For example, ISP 125 may have multiple servers in addition to SMTP server 135, such as SMTP server 130. In receiving electronic documents from SMTP server 130 and SMTP server 135, SMTP server 180 may detect that SMTP server 135 is blacklisted while SMTP server 130 is not. Consequently, SMTP server 180 may deliver documents sent from SMTP server 130 but reject those from SMTP server 135 and alert an administrator about the blacklisted status of SMTP server 135. In alternative embodiments, SMTP server 180 may determine that the domain for ISP 125, such as "ISP125.com", is blacklisted. In such a case, SMTP server 180 may reject all electronic documents transmitted from SMTP servers 130 and 135, and alert an ISP 125 administrator to the blacklisted status of the domain for ISP 125. Similarly, SMTP server 180 may reject all electronic documents transmitted from SMTP servers of ISP 125 within a certain range of IP addresses. For example, all ISP 125 servers may have IP addresses between 123.123.0.1 and 123.123.0.13 blacklisted. In corresponding embodiments, SMTP server 180 may reject any electronic documents transmitted from any server having an IP address within that range and alert an ISP 125 administrator to the blacklisted status of the range of IP addresses.

Figure 2:
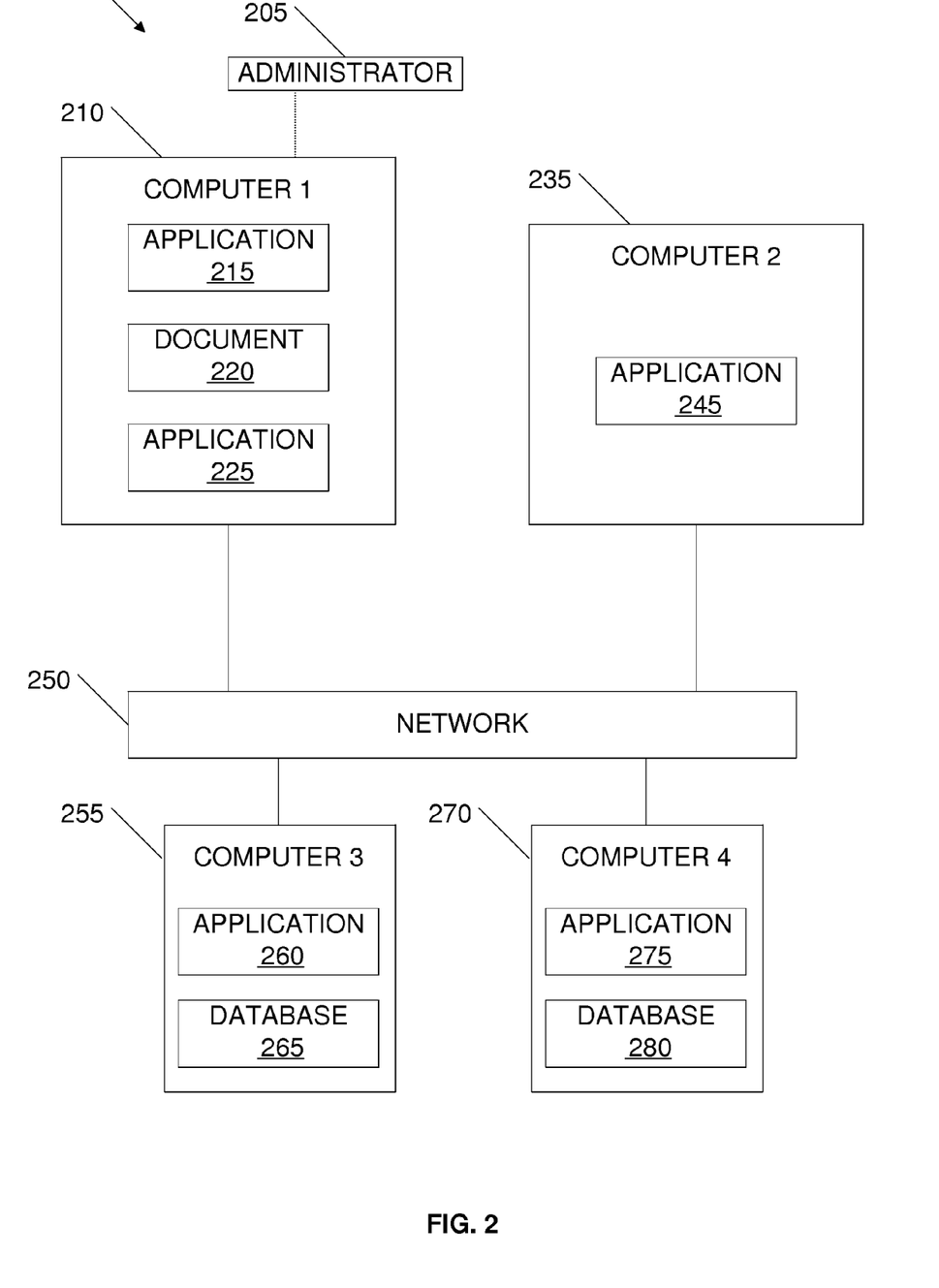
FIG. 2 illustrates a system composed of three computers that may determine the suspect status of a fourth computer and alert an administrator for the fourth computer about the suspect status.

Turning to FIG. 2, we see an alternative embodiment of a system 200 that may be used to alert an administrator 205 of a first computer 210 about computer 210 being blacklisted. Computer 210 may be a personal computer, a dedicated server machine, or any other type of computer connected to a network 250 and used to transfer an electronic document 220 to a second computer 235. Computers 210 and 235 may run any type of operating system. For example, computer system 210 may run Unix®, Microsoft® Windows®, OS/2®, Linux®, DOS, or Mac OS®.

Computer 210 may run a first application 215 to receive or create electronic document 220. For example, application 215 may comprise a POP or IMAP program which receives electronic document 220 from a client computer system connected to computer 210. In alternative embodiments, application 215 may comprise a word processor application used to create a word processing document. In one such an alternative embodiment, computer 210 may belong to a single person, such as administrator 205, or to a small business wherein computer 210 comprises a single computer system connected to network 250.

Computer 210 may run a second application 225 used to communicate or transfer a copy of document 220 to computer 235 over network 250. For example, application 225 may comprise an SMTP server application. Alternatively, application 225 may comprise a web page server, a file transfer protocol (FTP) server, a gopher server, or a telnet server, as examples. Application 225 may establish a communication link or session with application 245 running on computer 235. Application 245 may also be an SMTP server application, a telnet server or client, and so on. Application 225 and application 245 may communicate with each other one of a variety of communication protocols. For example, applications 225 and 245 may use simple mail transfer protocol, FTP, or Hyper Text Transfer Protocol (HTTP).

After establishing the communication session with application 245 using a communication protocol over network 250, application 225 may attempt to deliver or transfer a copy of document 220 to application 245. Depending on the protocol, handshaking between applications 225 and 245, and file type of document 220, application 225 may send some preliminary information concerning the transfer of document 220 to application 245. For example, application 225 may inform application 245 that document 220 is an American Standard Code for Information Interchange (ASCII) encoded text file or a binary encoded executable file. Application 225 may communicate this file type information so that application 245 will know how to handle document 220 upon reception. Alternatively, the file type information, if communicated, may actually be inserted into document 220, such as into a header section of document 220.

Application 225 may transfer a complete copy of document 220 to application 245, whereupon application 225 or application 245 may terminate the communication session. Upon completion of the transfer, application 245 may temporarily retain the copy of document 220 in memory or in a temporary file of a hard disk of computer 235. Application 245 may then establish another communication session with another computer 255 via network 250. Application 245 may communicate with application 260 running on computer 255. Application 260 may comprise a blacklist server application. Application 260 may work in conjunction with a database 265. Database 265 may comprise a list of IP addresses for computer systems or machines connected to network 250 that have been blacklisted or assigned a blacklist status. In alternative embodiments, database 265 may comprise a database application that works to deliver IP addresses for blacklisted computers to application 260. In further example embodiments, database 265 may contain Uniform Resource Locator (URL) addresses of blacklisted computers or domain names of blacklisted computer systems.

Application 245 may ask if application 225 or computer 210 has been blacklisted. For example, in some embodiments application 245 may copy one or more IP addresses, domain names, or URL addresses from document 220, such as from a header section of document 220. In alternative embodiments, application 245 may copy this identifying information for computer 210 or application 225 during its communication session with application 225. Application 245 may send this identifying information for application 225 or computer 210 to application 260, asking application 260 if the identifying information matches any of the records in blacklist database 265. In other words, application 245 asks application 260 if computer 210 is a blacklisted computer, is in a blacklisted domain, or if application 225 is a blacklisted application.

Application 260 may query database 265 and find a matching record, indicating that application 225 is a blacklisted application. Accordingly, application 260 may return a positive response back to application 245. Based upon this exchange, application 245 may determine that application 225 and/or computer 210 is blacklisted.

Upon determining that application 225 is blacklisted, application 245 may attempt to alert administrator 205 to the status of blacklisted application 225. To determine how to inform administrator 205 of the blacklisted status, application 245 may establish another communication session with a fourth computer 270. Computer 270 may run an application 275. Application 275 may comprise a WHOIS database server. In other words, application 275 may respond to requests of users and client applications dispatched through network 250, providing contact information for the registered owners or administrators of computers systems connected to network 250. For example, network 250 may comprise a section or portion of the Internet and application 275 may provide the names, addresses, telephone numbers, and contact e-mail addresses for the owners and administrators of computers 210, 235, 255, and 270.

After establishing the communication session with application 275, application 245 may request the contact information for computer 210. For example, application 245 may transmit the IP address for computer 210, which application 245 obtained during or after its communication session with application 225. Application 275 may receive the request with the accompanying IP address, query database 280, and provide the contact information for computer 210 back to application 245. The contact information provided by application 275 may contain an e-mail address for administrator 205. Application 245 may take the e-mail address and use it to compose and send an e-mail message to administrator 205, alerting administrator 205 to the status of blacklisted application 225. Application 245 may send the e-mail message to application 225. Upon reception of the e-mail message by application 225, administrator 205 may retrieve and read the message using application 215. After reading the message and being made aware of the blacklisting problem with application 225, administrator 205 may take the necessary steps to rectify the problem.

Figure 3:
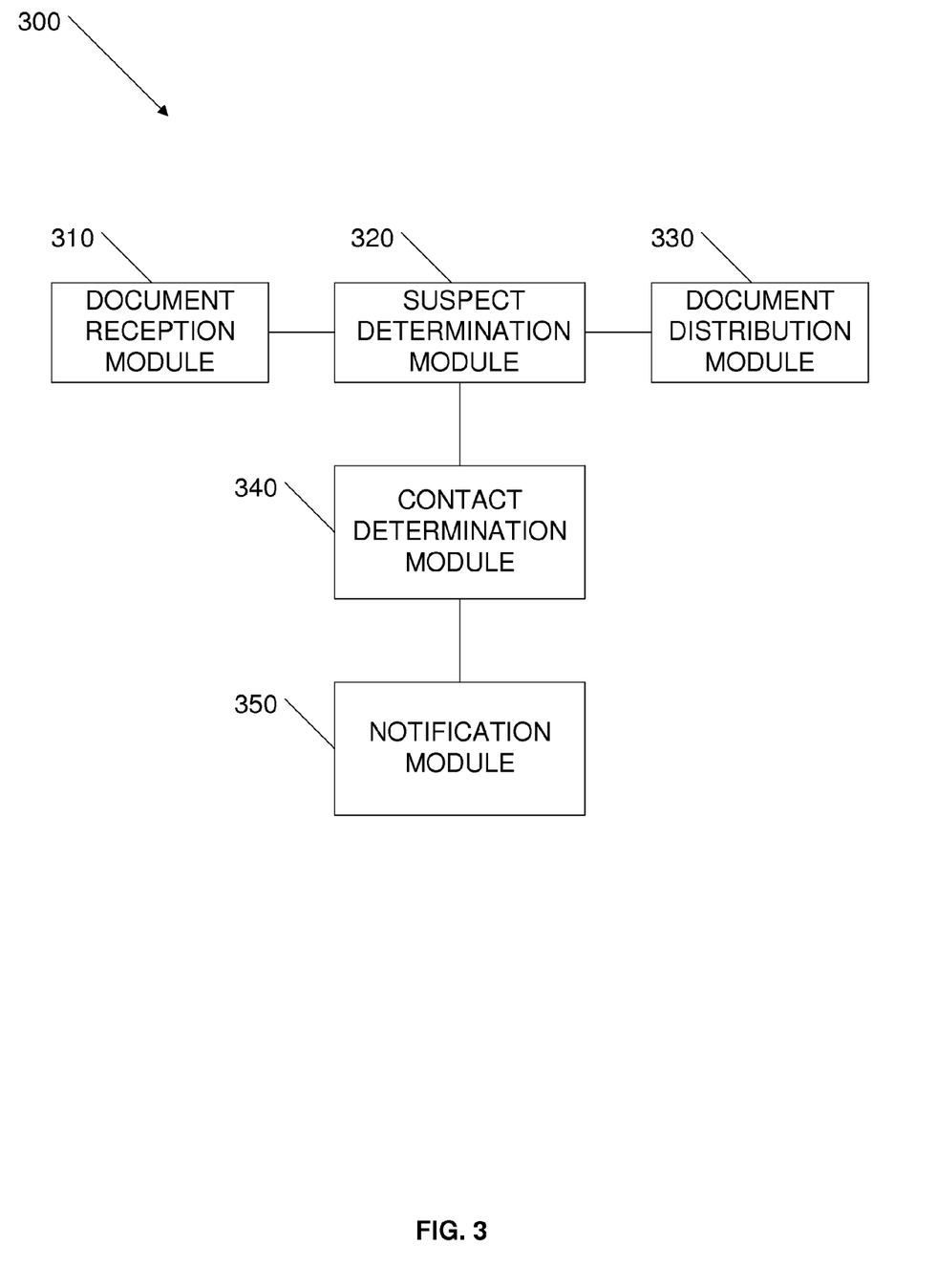
FIG. 3 depicts an embodiment of a system having document reception and distribution modules, as well as suspect determination, contact determination, and notification modules for communicating a server blacklisted status to an administrator of the server.

FIG. 3 shows another embodiment of a system 300 for communicating a server suspect status to an administrator of the server. System 300 has a document reception module 310 to receive an electronic document transferred from the suspect server. In some embodiments, document reception module may receive an e-mail document transferred from the suspect server. The e-mail document may comprise all ASCII text characters, potentially including characters representing uuencoded data for binary files appended or attached to the e-mail document. For example, the attached files may represent digitally encoded picture files or executable applications. In other embodiments, document reception module 310 may receive other types of digitally encoded files, such as encrypted files. Additionally, document reception module 310 may receive other information, such as information related to the file format, file transmission, file size, and the transferring server IP address and domain name. This other information may either precede or follow the transmission of the electronic document, or it may be added to the electronic document file itself. In some embodiments, document reception module 310 may receive only the electronic document. In other embodiments, document reception module 310 may receive only the other information. In even further embodiments, document reception module 310 may receive both the file information and the electronic document, or sections of either.

Document reception module 310 may communicate the information it received to a suspect determination module 320. Suspect determination module 320 may parse the information for the electronic document to determine the IP address of the server which sent the electronic document. Suspect determination module 320 may then consult one or more databases containing the IP addresses of blacklisted servers, or servers identified as having other problems, to determine if the server that sent the electronic document to document reception module 310 is suspect. Suspect determination module 320 may transmit the electronic document to document distribution module 330. If suspect determination module 320 determines that the server is not suspect, document distribution module 330 may transfer the document to its final destination. For example, if the electronic document is an e-mail document, document distribution module 330 may deliver it to e-mail inboxes for addressed recipients of the e-mail.

If suspect determination module 320 determines that the server is suspect, suspect determination module 320 may communicate this determination to document distribution module 330. Upon receiving the blacklisted status determination, document distribution module 330 may erase or delete the electronic document from a memory or storage device without delivering it to an intended recipient.

Suspect determination module 320 may also communicate the blacklisted status determination, along with the IP address for the suspect server, to a contact determination module 340. Upon receipt of the suspect server IP address, contact determination module 340 may determine the identity and contact information for an administrator of the suspect server. For example, contact determination module 340 may determine the registered owner of the suspect server, as well as the e-mail address of the registered owner. Contact determination module 340 may determine the owner and associated e-mail address by using SMTP exchange domain or MX Record information.

Contact determination module 340 may transfer the owner and e-mail address information for the suspect server to a notification module 350. Using the contact information, notification module 350 may send an e-mail to the owner, which may also be the administrator, alerting the owner about the suspect status of the server. In some embodiments, notification module 350 may send an SMTP e-mail message to the owner and/or administrator. In other embodiments, notification module 350 may use a plurality of other protocols, such as HTTP or other custom protocol.

Figure 4A:
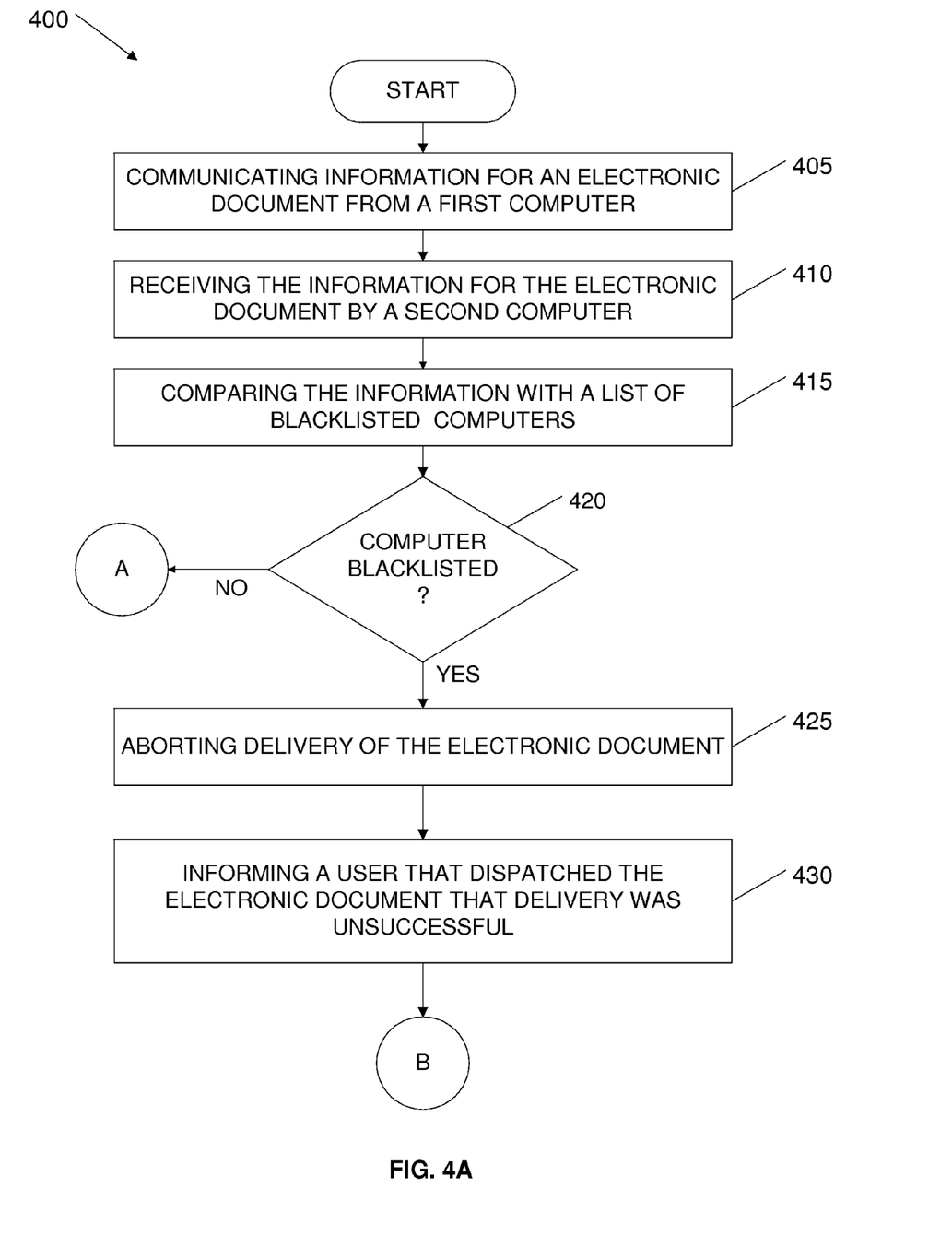
FIGS. 4A & B depict a flowchart of a method embodiment to alert an administrator about a suspect status of a computer.
Figure 4B:
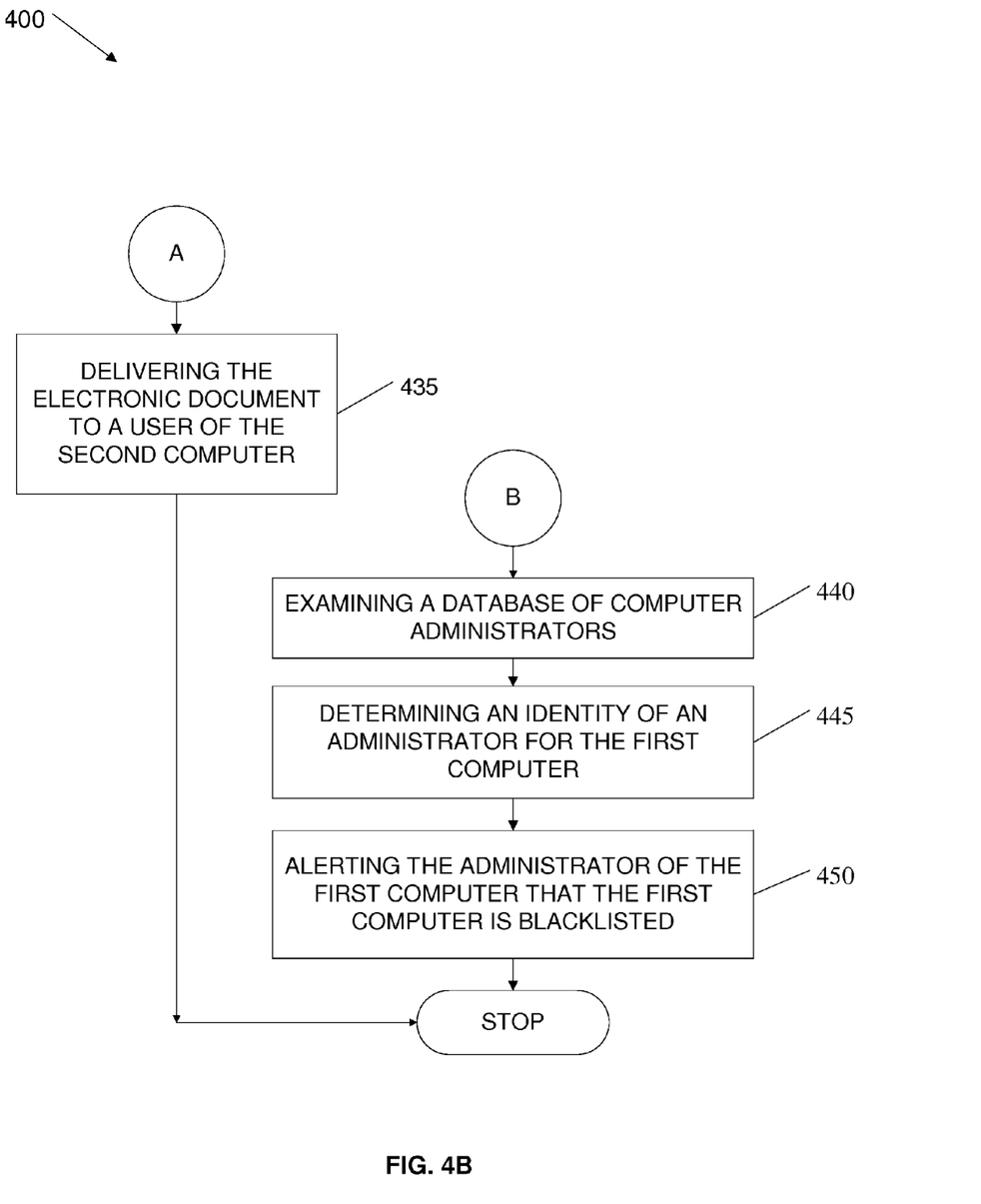

FIG. 4A and FIG. 4B depict a flowchart 400 of a method embodiment to alert an administrator about a blacklisted status of a computer. An embodiment according to flowchart 400 begins with communicating information for an electronic document from a first computer (element 405). For example, a server computer may run a software application, such as an FTP server, and deliver various types of electronic documents to client applications for computers that connect to the FTP server and request the documents. The server computer may be, as examples, a single personal computer connected to the Internet via a DSL modem or a bank of server computer systems in a complex network coupled to the Internet through a gang of networking devices, such as routers, switches, and hardware firewalls.

An embodiment of flowchart 400 continues by receiving the information for the electronic document by a second computer (element 410). In some embodiments, receiving the information may comprise receiving all or parts the electronic document. In other embodiments, receiving the information may comprise receiving transfer control protocol information, used to exchange the information of the electronic document between the first and second computers.

A method embodiment according to the embodiment of FIG. 4A and FIG. 4B may proceed by comparing the information with a list of blacklisted computers (element 415). The second computer may use all or part of the information received (element 410) in comparing the information with the list of blacklisted computers. For example, the second computer may extract the IP address from a header section of the electronic document and send it to numerous servers which maintain different lists of blacklisted servers. A match from any of the servers may indicate that the first computer has been blacklisted (element 420). If the first computer is not blacklisted according to the responses received from the blacklist servers, a method embodiment may conclude by delivering the electronic document to a user of the second computer (element 435).

If the first computer has been blacklisted (element 420), the method of FIG. 4A and 4B may continue by aborting delivery of the electronic document (element 425) and informing a user that dispatched the electronic document that delivery was unsuccessful (element 430). For example, the electronic document may be an e-mail document. The second computer may send the document back to the first computer and the sender, telling the sender that the document delivery was aborted due to the first computer being blacklisted. The second computer may also describe alternative actions that the sender may take to try and deliver the electronic document to intended recipients.

Upon aborting the delivery and informing the sender or user that dispatched the document (elements 425 and 430) an embodiment according to FIG. 4A and 4B may continue by examining one or more databases of computer administrators (element 440). For example, the second computer may examine several databases containing lists of registered owners for SMTP exchange domains. The second computer may examine the databases to determine the identity and contact information for an owner or administrator of the first computer (element 445). Upon determining the identity and contact information for the administrator of the first computer (element 445), a method embodiment according to FIG. 4A and 4B may conclude by alerting the administrator that the first computer is blacklisted (450). In some embodiments, the second computer may send an e-mail to the first computer administrator in order to alert the administrator to blacklisted status of the first computer administrator. In other embodiments, the second computer may initiate a telephone call to one or more of the contact telephone numbers contained in the SMTP exchange domain or MX Record. For example, the second computer may cause one of the listed telephone numbers to be dialed, whereupon a pre-recorded message will audibly inform the administrator about the blacklisted status of the first computer.

Alternative embodiments similar to the embodiment depicted in FIG. 4A and FIG. 4B may have fewer or more elements. For example, an alternative embodiment may not comprise informing a user that dispatched the electronic document that delivery was unsuccessful (element 430). Instead, the second computer may only attempt to alert the owner or administrator for the first computer system. As noted other alternative embodiments may also include additional elements. For example, other embodiments may include elements of informing the sender of the electronic document of the actions taken to resolve the problem, automatically or manually overriding the blacklisted status of the first computer under one or more conditions, releasing the blocking or blacklisting once the administrator remedies the problem, and automatically resending the electronic document once the problem has been resolved. In other alternative embodiments, the computer may have been identified as suspect instead of having been blacklisted. For example, element 415 may compare the information obtained from the first computer (element 410) with a list of suspect computers and determine that the first computer is suspect at element 420. Additionally, the second computer may alert the administrator of the first computer that the first computer is suspect (element 450).

Another embodiment of the invention is implemented as a program product for use with a system to alert an owner of a blacklisted server in accordance with, e.g., flowchart 400 as shown in FIG. 4A and FIG. 4B. The program(s) of the program product define functions of the embodiments (including the methods described herein) and can be contained on a variety of data-bearing media. Illustrative data-bearing media include, but are not limited to: (i) information permanently stored on non-writable storage media (e.g., read-only memory devices within a computer such as CD-ROM disks readable by a CD-ROM drive); and (ii) alterable information stored on writable storage media (e.g., floppy disks within a diskette drive or hard-disk drive). Such data-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and program products for alerting administrators of blacklisted servers and blacklisted computer systems. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to alert an administrator of a first computer, the method comprising:
    a second computer receiving information related to a communication of an electronic document, the electronic document being for delivery from the first computer to a third computer;
    the second computer identifying the first computer as an open relay based upon the information;
    the second computer preventing delivery of the electronic document to the third computer;
    the second computer obtaining, via a simple mail transport protocol (SMTP) exchange domain or a mail exchanger (MX) record, contact information for the first computer;
    the second computer transmitting a message based upon the contact information to indicate the first computer is an open relay; and
    the second computer sending an acknowledgement to the first computer, the acknowledgment informing the first computer that the second computer successfully received the communication but the electronic document is rejected, the acknowledgement causing the first computer to store the electronic document.

2. The method of claim 1, further comprising:
    the second computer sending a second message addressed to a user who initiated the communication of the electronic document, the second message indicating a delivery status of the electronic document, and the second message describing actions that the user may take to deliver the electronic document to an intended recipient.

3. The method of claim 1, further comprising:
    after the second computer preventing delivery of the electronic document to the third computer, the second computer receiving a second communication of the electronic document;
    the second computer delivering the electronic document to the third computer responsive to receiving the second communication; and
    the second computer notifying the first computer that the delivering the electronic document to the third computer was successful.

4. The method of claim 3, further comprising:
    the second computer indicating in the message a reason for regarding the first computer as open relay;
    the second computer informing a sender of the electronic document at the first computer about an action taken using the contact information;
    the second computer receiving a request to remove an open relay status of the first computer; and
    the second computer, in response to receiving the request, verifying that the first computer is not an open relay.

5. The method of claim 1, further comprising:
    the second computer bypassing, for a period of time, an open relay server routine of the second computer, wherein the second computer preventing delivery of the electronic document to the third computer comprises the second computer preventing delivery of the electronic document to the third computer after the period of time.

6. The method of claim 1, wherein the second computer identifying the first computer as an open relay comprises the second computer comparing a network address of the first computer with one or more network addresses listed in an open relay database.

7. A computer system for alerting an administrator of a first computer that the first computer is an open relay, the computer system comprising:
    one or more processors, one or more computer-readable memories and one or more computer-readable tangible storage devices;
    program instructions, stored on at least one of the one or more storage devices for execution by at least one of the one or more processors via at least one of the one or more memories, to receive information associated with a communication of an electronic document from the first computer;
    program instructions, stored on at least one of the one or more storage devices for execution by at least one of the one or more processors via at least one of the one or more memories, to determine, using the information, whether the first computer is listed in an open relay database;
    program instructions, stored on at least one of the one or more storage devices for execution by at least one of the one or more processors via at least one of the one or more memories, to reject the electronic document in response to determining that the first computer is an open relay;
    program instructions, stored on at least one of the one or more storage devices for execution by at least one of the one or more processors via at least one of the one or more memories, to obtain contact information for the first computer; and
    program instructions, stored on at least one of the one or more storage devices for execution by at least one of the one or more processors via at least one of the one or more memories, to transmit a message based upon the contact information, wherein the message indicates that the first computer is an open relay; and
    program instructions, stored on at least one of the one or more storage devices for execution by at least one of the one or more processors via at least one of the one or more memories, to send an acknowledgement to the first computer, the acknowledgment informing the first computer that the computer system successfully received the communication but the electronic document is rejected, the acknowledgement causing the first computer to store the electronic document;
    wherein the program instructions to reject the electronic document in response to determining the first computer is an open relay prevent delivery of the electronic document to a user of the computer system; and
    wherein the program instructions to obtain contact information for the first computer perform a WHOIS query of a second computer.

8. The computer system of claim 7, further comprising:
    program instructions, stored on at least one of the one or more storage devices for execution by at least one of the one or more processors via at least one of the one or more memories, to count a number of documents transmitted to the computer system from the first computer;
    program instructions, stored on at least one of the one or more storage devices for execution by at least one of the one or more processors via at least one of the one or more memories, to deliver the electronic document unless the number exceeds a threshold; and program instructions, stored on at least one of the one or more storage devices for execution by at least one of the one or more processors via at least one of the one or more memories, to send a second message addressed to a user who initiated the communication of the electronic document, the second message indicating a delivery status of the electronic document, and the second message describing actions that the user may take to deliver the electronic document to an intended recipient.

9. The computer system of claim 7, further comprising:
program instructions, stored on at least one of the one or more storage devices for execution by at least one of the one or more processors via at least one of the one or more memories, to receive a resend of the electronic document from the first computer;
program instructions, stored on at least one of the one or more storage devices for execution by at least one of the one or more processors via at least one of the one or more memories, to deliver the electronic document to the user responsive to receiving the resend; and
program instructions, stored on at least one of the one or more storage devices for execution by at least one of the one or more processors via at least one of the one or more memories, to notify the first computer that the electronic document was successfully delivered.

10. A computer program product for alerting an administrator of a sending computer about an open relay status of the sending computer, the computer program product comprising:
one or more computer-readable tangible storage devices;
program instructions, stored on at least one of the one or more storage devices, to receive information related to a communication of an electronic document from the sending computer;
program instructions, stored on at least one of the one or more storage devices, to determine that the sending computer is an open relay based upon the information;
program instructions, stored on at least one of the one or more storage devices, to prevent delivery of the electronic document to a receiving computer so that a user of the receiving computer does not receive the electronic document;
program instructions, stored on at least one of the one or more storage devices, to obtain, via a simple mail transport protocol (SMTP) exchange domain or a mail exchanger (MX) record, contact information of the administrator;
program instructions, stored on at least one of the one or more storage devices, to transmit a message to alert the administrator that the sending computer is an open relay; and
program instructions, stored on at least one of the one or more storage devices, to send an acknowledgement to the sending computer, the acknowledgment informing the sending computer that the communication was successfully received from the sending computer but the electronic document is rejected, the acknowledgement causing the sending computer to store the electronic document.

11. The computer program product of claim 10, wherein the program instructions to obtain the contact information of the administrator send a query to a server of the SMTP exchange domain or the MX record.

12. The computer program product of claim 11, wherein the program instructions to obtain the contact information of the administrator examine registered owners of the SMTP exchange domain.

13. The computer program product of claim 10, wherein the message is a pre-recorded message, and wherein the program instructions to transmit the message to alert the administrator communicate the message via dialing a telephone and play the message to audibly alert the administrator.

14. The computer program product of claim 10, wherein the program instructions to receive information related to the electronic document communicated from the sending computer receive header information of an e-mail document communicated from an SMTP server.

15. The computer program product of claim 10, wherein the program instructions to determine that the sending computer is an open relay based upon the information communicate with a server that comprises a database of open relays.

16. The computer system of claim 7, further comprising:
program instructions, stored on at least one of the one or more storage devices for execution by at least one of the one or more processors via at least one of the one or more memories, to override rejection of the electronic document for a period of time.

17. The computer system of claim 7, further comprising:
program instructions, stored on at least one of the one or more storage devices for execution by at least one of the one or more processors via at least one of the one or more memories, to indicate in the message a reason for regarding the first computer as open relay;
program instructions, stored on at least one of the one or more storage devices for execution by at least one of the one or more processors via at least one of the one or more memories, to inform a sender of the electronic document at the first computer about an action taken using the contact information.

18. The computer program product of claim 10, further comprising:
program instructions, stored on at least one of the one or more storage devices, to send a second message addressed to a user who initiated the communication of the electronic document, the second message indicating a delivery status of the electronic document, and the second message describing actions that the user who initiated the communication may take to deliver the electronic document to user of the receiving computer.

19. The computer program product of claim 10, further comprising:
program instructions, stored on at least one of the one or more storage devices, to receive a resend of the electronic document from the sending computer at a later time;
program instructions, stored on at least one of the one or more storage devices, to deliver the electronic document to the user of the receiving computer responsive to receiving the resend; and
program instructions, stored on at least one of the one or more storage devices, to notify the sending computer that the electronic document was successfully delivered.

20. The computer program product of claim 10, further comprising:
program instructions, stored on at least one of the one or more storage devices, to indicate in the message a reason for regarding the sending computer as open relay;
program instructions, stored on at least one of the one or more storage devices, to inform a user who initiated the communication of the electronic document at the sending computer about an action taken using the contact information.

* * * * *